United States Patent [19]

Loper, Jr. et al.

[11] 4,157,041

[45] Jun. 5, 1979

[54] SONIC VIBRATING BELL GYRO

[75] Inventors: Edward J. Loper, Jr.; David D. Lynch, both of Santa Barbara, Calif.

[73] Assignee: General Motors Corporation, Detroit, Mich.

[21] Appl. No.: 908,548

[22] Filed: May 22, 1978

[51] Int. Cl.² .......................... G01P 9/04; G01C 19/56
[52] U.S. Cl. .................................................... 73/505
[58] Field of Search .......... 73/505, 517 AV, 517 AR; 74/5, 514

[56] References Cited

U.S. PATENT DOCUMENTS

| | | | |
|---|---|---|---|
| 3,656,354 | 4/1972 | Lynch | 73/505 |
| 3,678,762 | 7/1972 | Denis | 73/505 |
| 3,719,074 | 3/1973 | Lynch | 73/505 |

*Primary Examiner*—James J. Gill
*Attorney, Agent, or Firm*—Albert F. Duke

[57] ABSTRACT

A vibratory gyro including a hemispherical high Q resonator supported by an inner housing carrying a circular forcer electrode and sixteen discrete forcer electrodes. The orientation of the vibrating pattern in the resonator is electrostatically sensed by eight pickoff electrodes located on the inner spherical surface of an outer housing which establish two pickoff axes separated by 45°. Signals obtained from the pickoff electrodes are utilized to develop a drive signal to the circular forcer electrode to electrostatically maintain a predetermined amplitude of pattern vibration and to develop drive signals for appropriate groups of discrete forcer electrodes to eliminate any phase error between components of the pattern along the two pickoff axes.

10 Claims, 10 Drawing Figures

SONIC VIBRATING BELL GYRO

The invention herein described was made in the course of work under contract or subcontract thereunder with the Department of Defense.

This invention relates to vibratory rotation sensors, and more particularly to a sensor of the "vibrating bell" type, referred to as a sonic gyro. Such a gyro is disclosed in U.S. Pat. Nos. 3,625,067; 3,656,354; 3,678,762 and 3,719,074, assigned to the assignee of the present invention.

The sonic gyro includes a high Q resonator which is hemispherically shaped and exhibits an elliptical vibration pattern in a plane perpendicular to its polar axis when excited in its lowest order bending mode. Rotation of the resonator about an input axis coinciding with the polar axis causes pattern rotation of approximately 72% of input rotation relative to inertial space. There are two principle or normal mode axes which exist in the resonator which are separated by 45°. Due to asymmetries in resonator thickness the resonant frequency along one of the two normal mode axes is different from the resonant frequency along the other axis. Therefore, the elliptical vibration pattern vibrates at one frequency if aligned with one of the axes and at a slightly different frequency when aligned with the other axis. At any other location the vibration pattern will consist of a superposition of these two normal modes of vibration.

In order to maintain the pattern amplitude the energy lost by the resonator during vibration must be replenished. One approach is shown in Lynch U.S. Pat. No. 3,719,074, wherein the resonator is parametrically driven by a circular forcer electrode. Heretofore, however, it has not been recognized that a substantial drift error is introduced unless the two components of pattern vibration are in phase with one another since otherwise the parametric drive will preferentially drive the components. Thus it is advantageous to maintain the entire resonator motion at a single frequency and phase regardless of pattern location. Furthermore, when the sonic gyro is operated as an integrating gyro, inaccuracies are introduced in the amount of pattern rotation resulting from an input rotation unless the entire resonator is vibrating at a single frequency and phase. It is to be understood that the frequency, while singular, is not necessarily constant and may vary with pattern rotation.

Accordingly, it is an object of the present invention to provide a vibratory rotation sensor wherein the resonator motion is maintained at a predetermined amplitude and at a single frequency and phase regardless of pattern location.

It is another object of the present invention to provide a parametrically driven sonic gyro which exhibits a minimum of parametric drive drift rate, and a constant scale factor between input rotation and angle readout to thereby ensure a more accurate instrument.

Other objects and advantages of the present invention will be apparent from the following detailed description which should be read in conjunction with the drawings in which.

Figure 1:
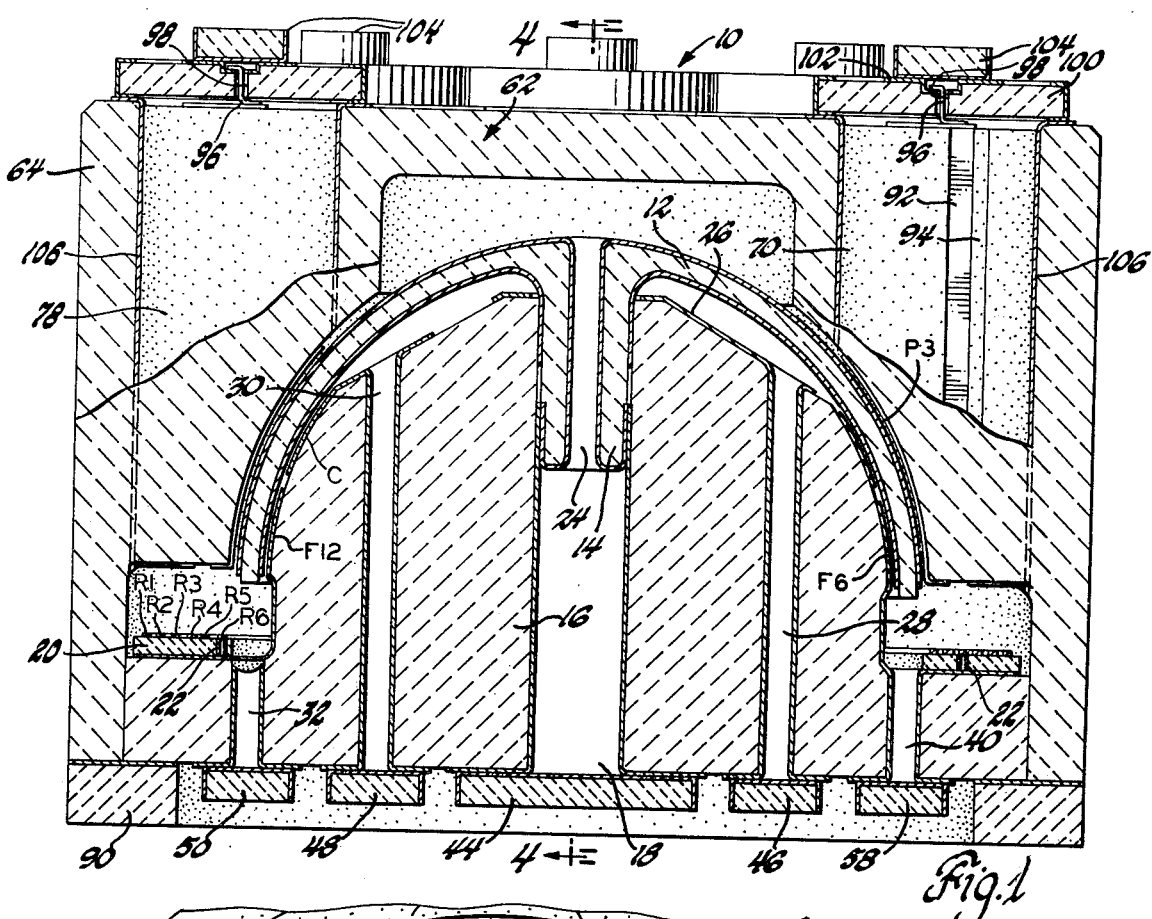
FIG. 1 is a cross sectional view of the gyro of the present invention taken on line 1—1 of FIG. 6.

Referring now to the drawings and initially to FIG. 1, the sonic gyro of the present invention is generally designated 10. The gyro 10 is a single axis instrument including a hemispherically shaped inertially sensitive element or resonator generally designated 12 having an integral stem 14, located at the pole of the hemisphere. The resonator is preferably formed of fused quartz and is preferably constructed as uniform as possible around any line of longitude.

Figure 5:
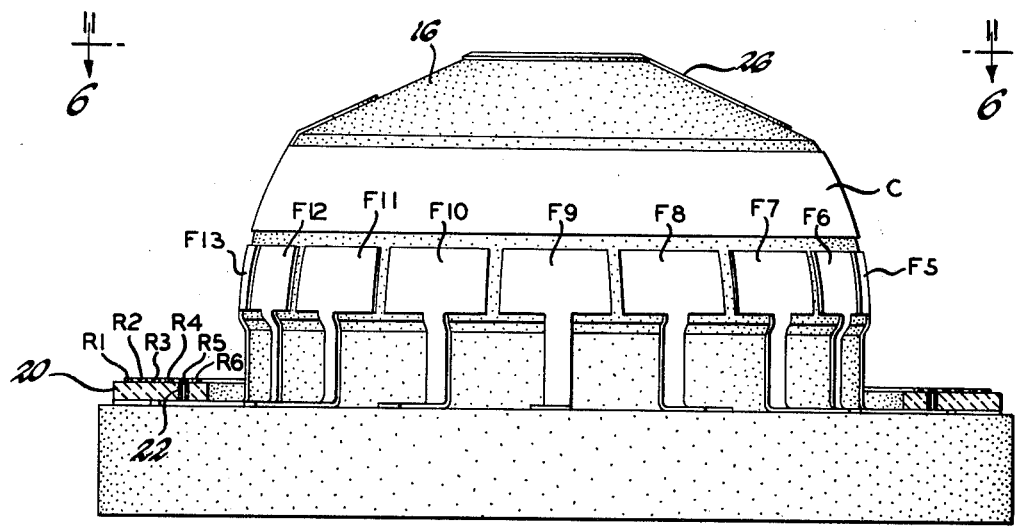
FIG. 5 is an elevational view of the forcer housing showing the discrete and circular forcer electrodes.
Figure 6:
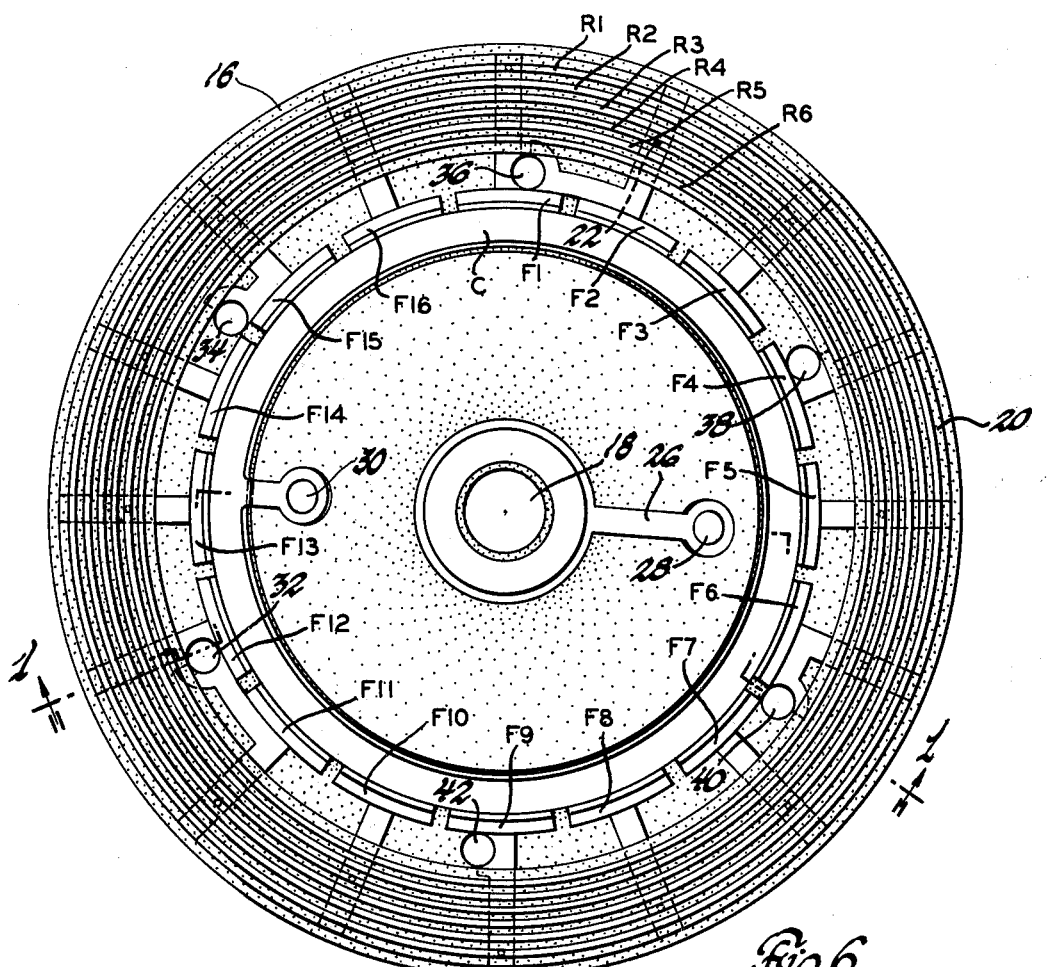
FIG. 6 is a view taken along line 6—6 of FIG. 5 showing various reference signal waveforms.

A forcer housing generally designated 16 supports the resonator 12 along an input axis extending through the pole of the resonator and is preferably formed of fused quartz. The housing 16 has a central passage 18 which receives the stem 14. The stem 14 is bonded to the surface of the passage 18 by a bonding material such as silver impregnated glass frit. The housing 16 is provided with chromium forcer electrodes plated on the spherical outer surface thereof as shown in FIGS. 5 and 6. These forcer electrodes include a circular forcer electrode designated C and sixteen discrete forcer electrodes designated F1–F16. Certain ones of the electrodes F1–F16 are electrically connected together through a quartz circuit board 20 carrying six conductive rings R1–R6. Each ring connects a plurality of forcer electrodes together through passages 22 which extend through the board 20. The surfaces of the passages 22 are plated with electrically conductive material in order to make electrical contact between the appropriate ones of the rings R1–R6 and the electrodes F1–F16. As will be described hereinafter, the forcer electrodes F1–F9 are used to initiate vibration of the resonator 12. After start-up the forcer electrodes F1–F16 are interconnected in groups of four (separated by 90°) for phase control of the gyro.

Figure 2:
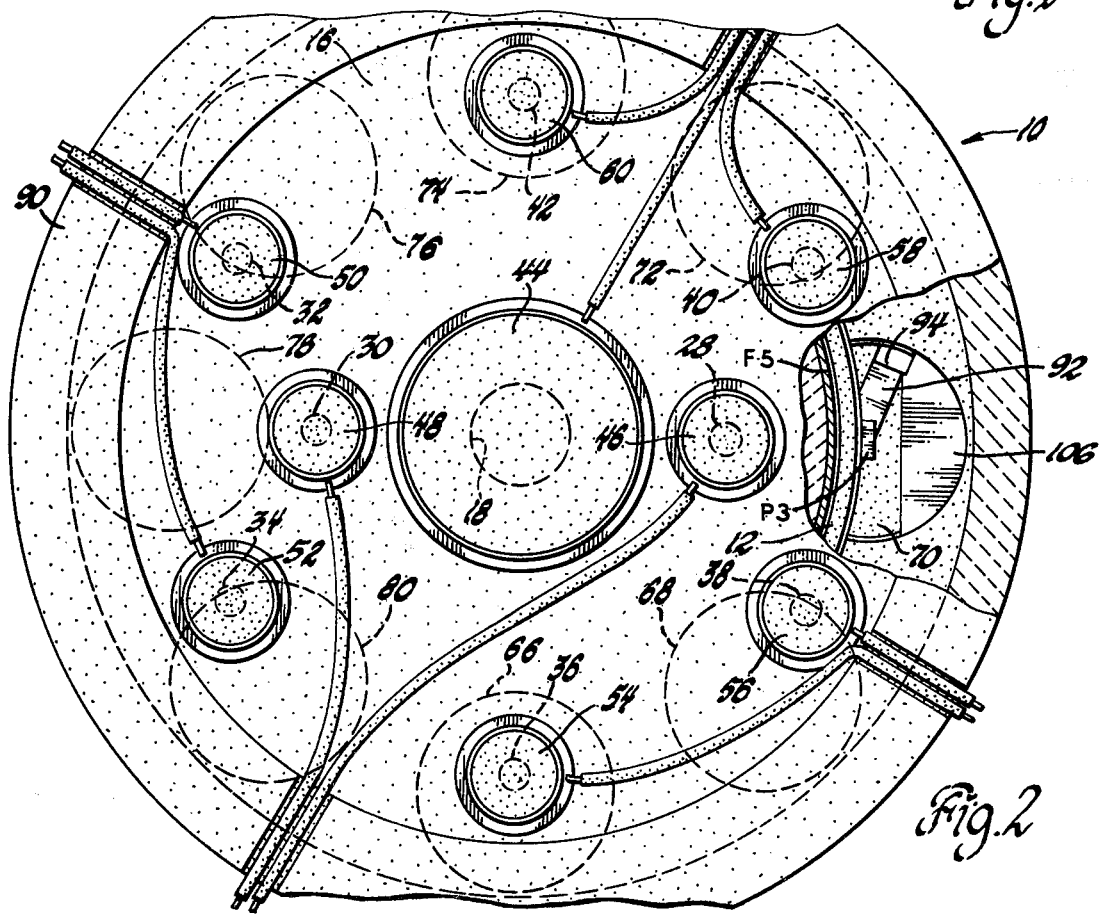
FIG. 2 is a bottom plan view with parts broken away and in section.
Figure 3:
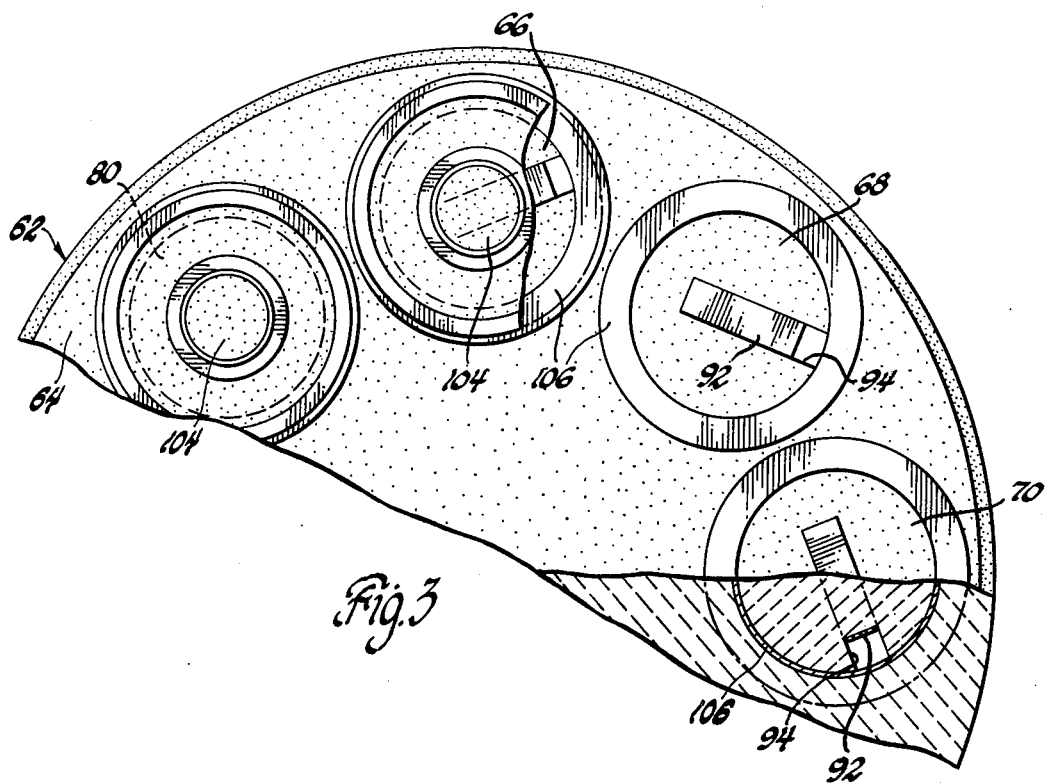
FIG. 3 is a partial top plan view with parts broken away and in section.

The inner and outer surfaces of the resonator 12 are chromium plated except for the lip portion. Electrical contact with the outer surface of the resonator is made through the surface of the passage 18 in the housing 16, and the passage 24 through the stem 14. Electrical contact with the inner surface of the resonator 12 is made from the plated portion of the outer surface of the stem 14 to the chromium plated area designated 26 on the forcer housing 16 and the plated surface of the passage 28 as shown in FIGS. 1, 5 and 6. Electrical contact with the parametric forcer electrode C is made through the plated surface of the passage 30. Electrical contact with six of the forcer electrodes is made directly through the plated surface of passages 32–42 as shown in FIGS. 1 and 2, the remaining electrodes being interconnected with the six through the circuit board 20. The passages 18, 28, 30 and 32–42 are hermetically sealed by covers 44–60, respectively, after a suitable atmosphere is established about the resonator 12.

Figure 4:
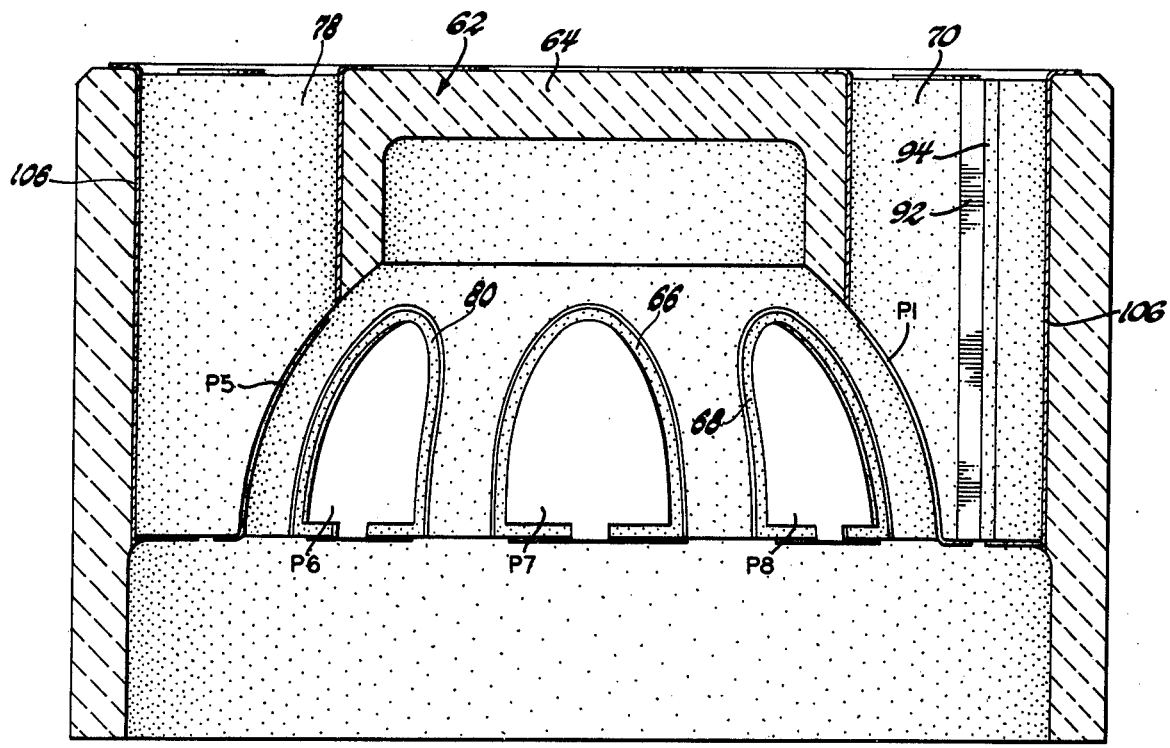
FIG. 4 is a cross sectional view taken on line 4—4 of FIG. 1 with parts removed.

The gyro 10 further comprises a pickoff housing assembly generally designated 62. The assembly 62 includes a fused quartz pickoff housing 64 having passages for receiving eight separate quartz pickoff rods 66-80. Each pickoff rod has a discrete chromium pickoff pad respectively designated P1-P8 (FIG. 4) plated on the spherical surface thereof. The pickoff housing 64 is bonded to the forcer housing 16 by a mounting ring 90. Electrical connection to the individual pickoff electrodes is through a plated surface 92 of the slot 94 formed in the pickoff rods 68-80. The plated surface 92 is connected with a conductor 96 which extends through a passage 98 in a cover 100 and makes electrical contact with a plated surface 102 formed in the cover 100. Pickoff output conductors, now shown, are connected with the plated surface 102. A cover 104 hermetically seals the passage 98. The pickoff rods 66-80 are bonded to the surfaces of the passages in the housing 64 with an electrically conductive bonding material which forms a guard cup 106 surrounding the pickoff pads P1-P8. The cover 100 hermetically seal the passages receiving the pickoff rods 66-80.

The pickoff pads P1-P8 are each preferably the same area with a uniform gap established between the pads and the resonator 12 so as to produce equal capacitances. The inner surface of the resonator 12 is at ground potential while the outer surface is maintained, for example, at 90 volts dc. The voltage at the pickoff pads P1-P8 is dependent upon the voltage gradient in the gap between the pickoff pad and the resonator when the resonator 12 flexes. For example, if the resonator changes its position by one percent of the gap, then one percent of the voltage on the resonator is coupled to the pickoff pad. The pickoff signal is amplified and fed back to the guard cup 106 to prevent any leakage between the pickoff pads and the other electrical circuits.

Figure 7:
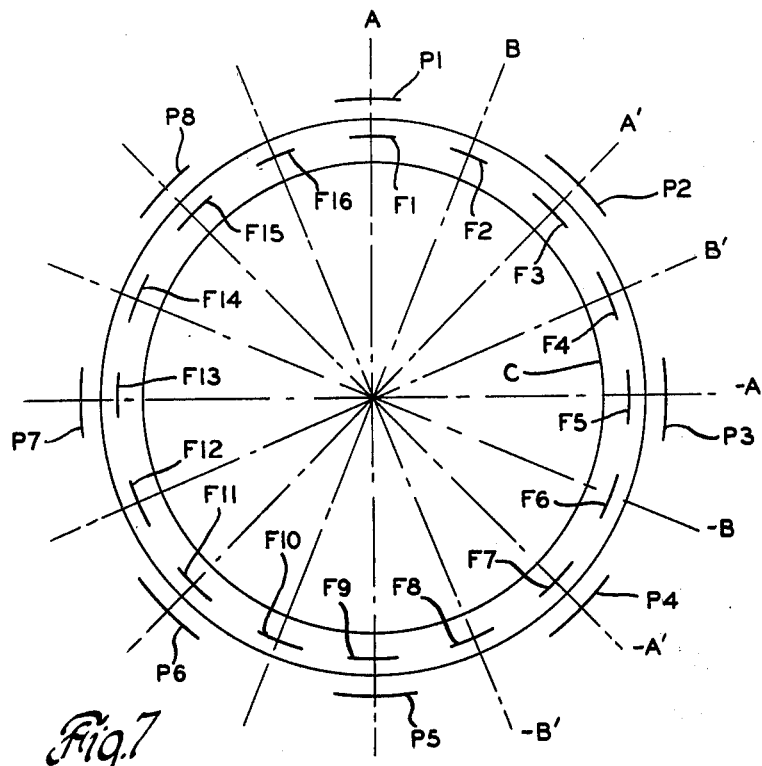
FIG. 7 is a pictorial representation of the electrode structure.

The resonator 12 is excited by application of a periodic voltage to forcer electrodes F1 and F9 to establish an elliptical vibration pattern. As shown in FIG. 7, the pickoff electrodes P1, P3, P5, P9 and the forcer electrodes F1, F5, F9, F13 define axes designated A, -A (hereinafter called axis set A) while the pickoff electrodes P2, P4, P6, P8 and the forcer electrodes F3, F7, F11, F15 define axes A', -A' (hereinafter called axis set A') separated from axis set A by 45°. The antinodes of the elliptical vibration pattern may be located at any angle $\theta$ with respect to axis set A' in the resonator 12. When the pattern is located precisely along axis set A, then the axis set A' defines a location where there is no fundamental component of pattern vibration. Similarly when the pattern is located precisely along axis set A' there is no fundamental component of pattern vibration along lines defined by the axis set A. When the pattern is located along some other axis set making an angle $\theta$ with respect to the A' axis set, fundamental components will exist along the axis sets A and A' proportional to $\sin 2\theta$ and $\cos 2\theta$, respectively. As the resonator 12 vibrates, a sinusoidal signal appears at the pickoff electrodes P1, P5, and P3, P7 which has an amplitude proportional to the sine of $2\theta$. A sinusoidal signal also appears at the pickoff electrodes P2, P6 and P4, P8 which has an amplitude proportional to the cosine of $2\theta$. The signals at the pickoff pads P1-P8 are used to identify the location $\theta$ of the pattern. The signals are also used to develop control voltages to be applied to circular forcer electrode C to maintain a predetermined vibration pattern amplitude, and to be applied to certain of the discrete forcers F1-F16 in order to maintain the components of the pattern along axis sets A and A' in phase one with the other. The forcer electrodes F2, F6, F10, F14 are displaced 22½° from the axis set A along an axis set designated B, -B (hereinafter called B) while the forcer electrodes F4, F8, F12, F16 are displaced 22½° from the axis set A' along an axis designated B', -B' (hereinafter called B').

Figure 8:
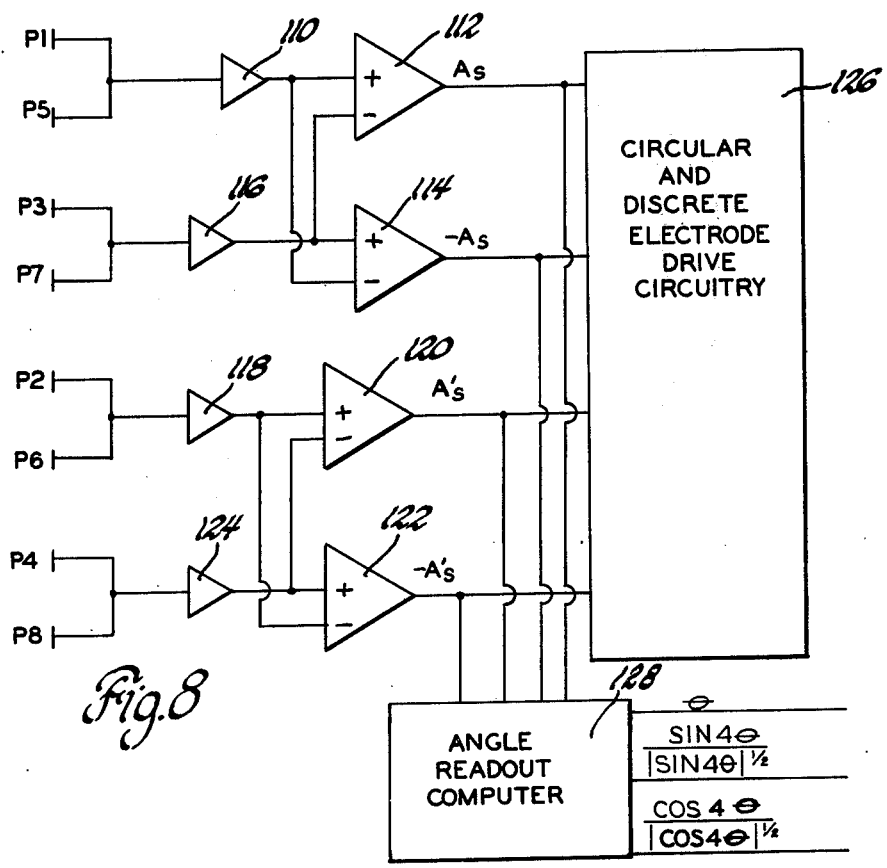
FIG. 8 is an overall block diagram of the signal processing and control circuitry of the present invention.

Referring now to FIG. 8, the pickoff pads P1 and P5 are tied together to provide an input to a buffer amplifier 110 the output of which is connected with the noninverting input of a differential amplifier 112 and the inverting input of a differential amplifier 114. The pickoff pads P3 and P7 are tied together and connected as an input to buffer amplifier 116 the output of which is connected with the inverting input of the differential amplifier 112 and the noninverting input of the differential amplifier 114. The signals at the pads P1 and P5 are identical. The signals at the pads P3 and P7 are also identical but 180° out of phase with the signals at the pads P1 and P5. Differentially adding the signals at the pads P1 and P5 with the signals at the pads P3 and P7 produces an output signal $A_s$ which is twice the amplitude of the signal on the pads P1 and P5 and represents an electrical analog of that portion of the mechanical modulation, i.e., radial displacement along the axis set A. The signals $A_s$ is of the form $A_0 \sin 2\theta \sin \omega t$ where $A_0 \sin 2\theta$ is the amplitude of the component of the vibration along axis set A; $\theta$ being the angle of the vibration pattern relative to the axis set A'; and $\sin \omega t$ representing the time varying part of pattern vibration.

The signal from the pads P2 and P6 provide inputs to a buffer amplifier 118 the output of which is connected with the noninverting input of a differential amplifier 120 and the inverting input of a differential amplifier 122. Pickoff pads P4 and P8 are tied together and provide an input to buffer amplifier 124 the output of which is connected with the inverting input of the differential amplifier 120 and the noninverting differential amplifier 122. This arrangement produces an output signal designated $A_s'$ which is proportional to the mechanical modulation along the axis set A'. The signal $A_s'$ is of the form $A_0 \cos 2\theta \sin \omega t$ where $A_0 \cos 2\theta$ is the amplitude of the vibration pattern along axis set A'. The signals designated $-A_s$ and $-A_s'$ are the mirror images of the signals $A_s$ and $A_s'$ respectively. The outputs of the buffer amplifiers 110, 116, 118 and 124 are also used to drive the guard cups which surrounds the pads P1, P5; P3, P7, P2, P6; and P4, P8 respectively to reduce capacitive leakage and coupling effects of the adjacent pads and ground surfaces. The signals $\pm A_s$ and $\pm A_s'$ provide inputs to electrode drive circuitry 126, the purpose of which is to maintain the entire resonator motion at a single frequency and predetermined amplitude and ensure that components of the pattern along axis sets A and A' are in phase, through application of appropriate signals to electrodes C and F1-F16. The signals $\pm A_s$ and $\pm A_s'$ also provide inputs to an angle readout computer 128 which determines pattern location $\theta$. The circuitry 128 may be that shown in U.S. patent application Ser. No. 833,065, filed Sept. 14, 1977 and assigned to the assignee of the present invention and incorporated herein.

Figure 9:
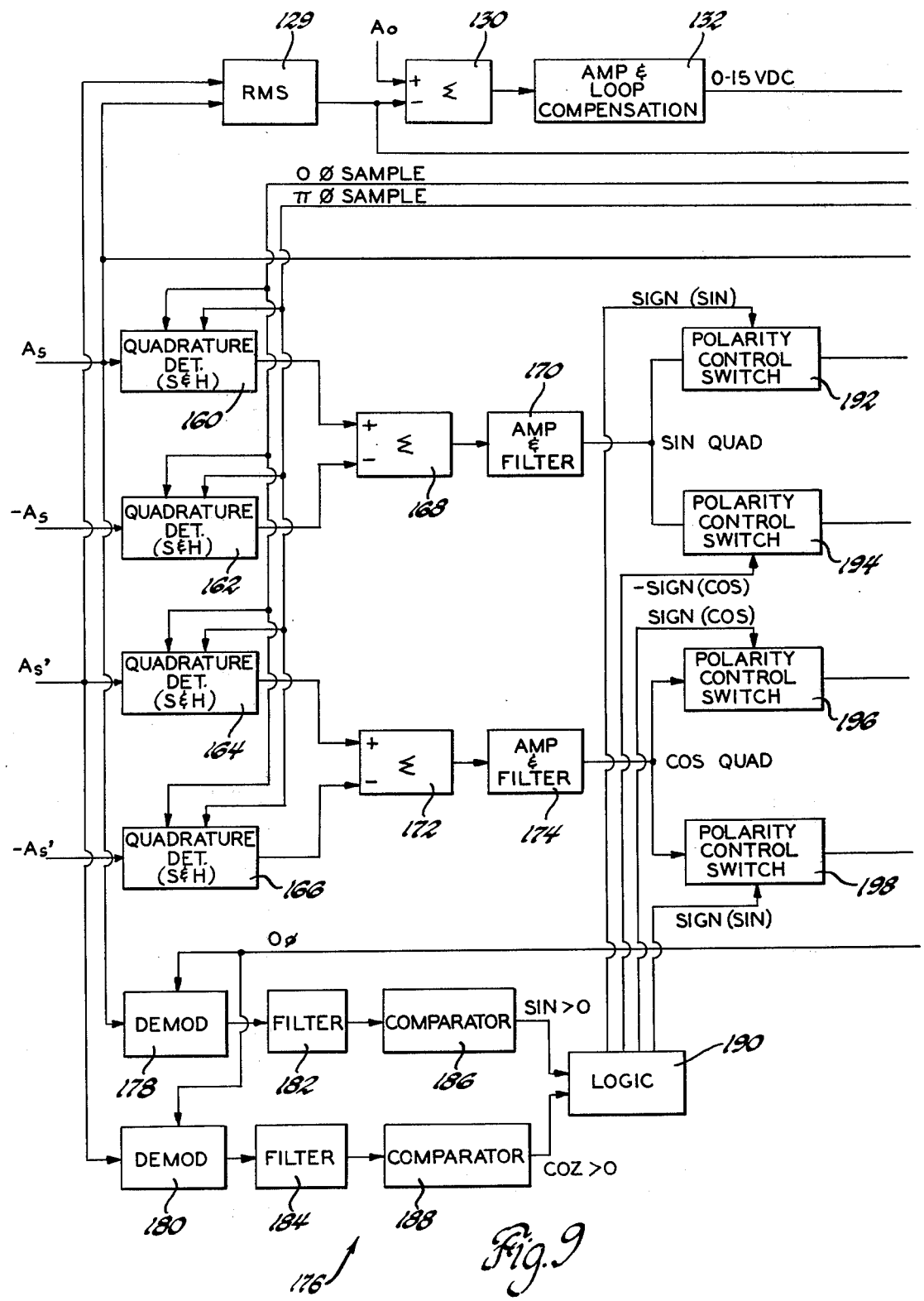
FIGS. 9 and 9A is a more detailed block diagram of the circuitry of FIG. 8.
Figure 9A:
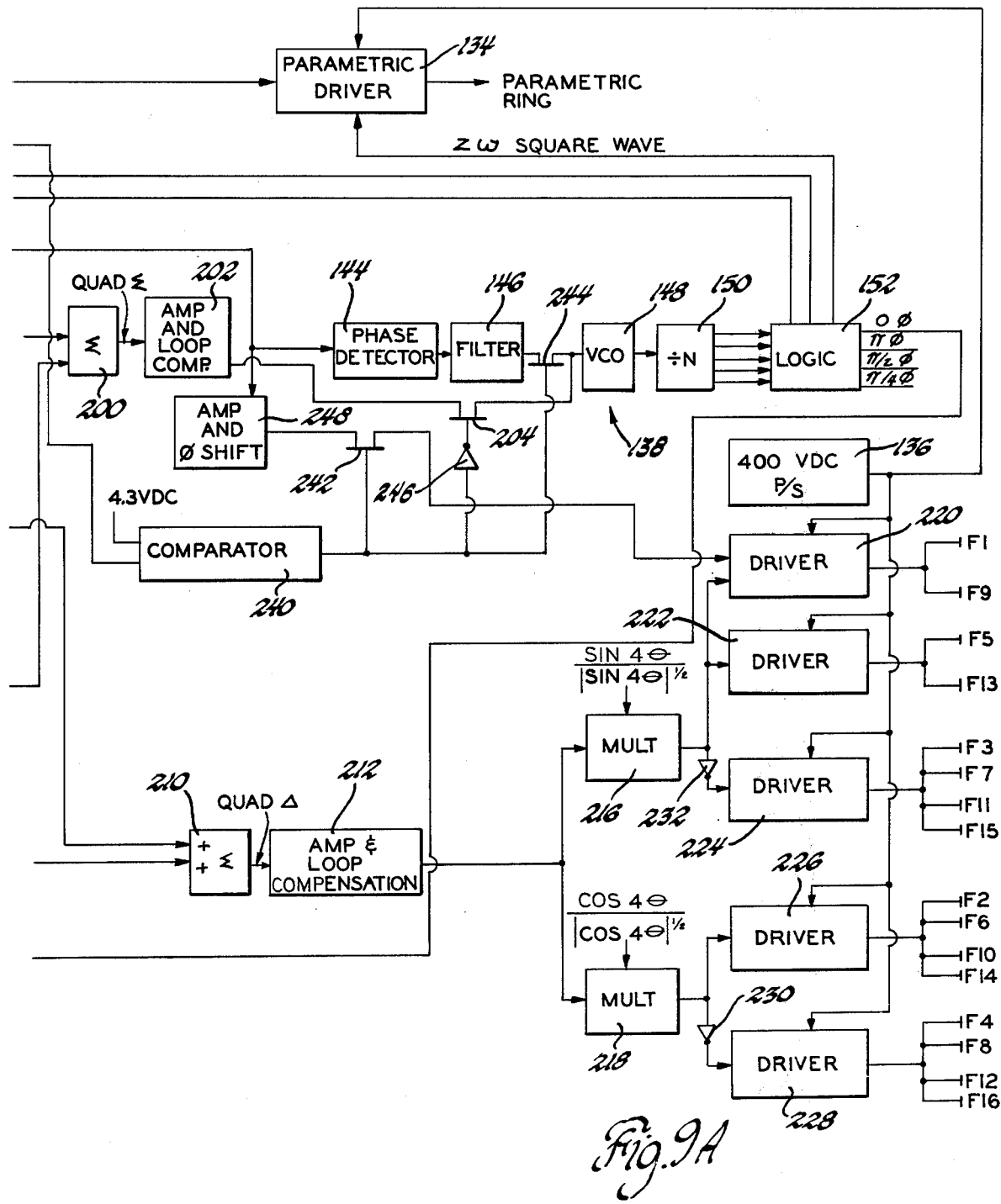

Referring now to FIGS. 9 and 9A, the electrode drive circuitry 126 is shown in greater detail. The signals $A_s$ and $A_s'$ are applied to an RMS detector 129 which produces a dc output equal to the square root of the sum of the squares of the two input signals, i.e., the magnitude of their vector sum. The purpose of the parametric drive circuitry is to maintain a constant vibration pattern amplitude. To this end the output of the detector 129 is compared at 130 with a reference dc voltage $A_0$ representing the desired amplitude of the resonator vibration. Any error signal at the output of adder 130 is applied to amplifying and loop compensation circuitry 132 which insures stability of the amplitude control loop. The output of the circuitry 132 provides the control to a driver 134 which applies a voltage between the resonator outer surface and the circular electrode C of 0–400 volts dc from a power supply 136 depending on the error developed. Thus, the level of the voltage applied to the circular electrode C is sufficient to maintain the magnitude of the vector sum of the components of vibration along the axes A and A' equal to a reference amplitude. The voltage is applied to the electrode C at a frequency $2w_0$ where $w_0$ is a pattern-location dependent weighted average of the frequencies of the signals $A_s$ and $A_s'$. The signal applied to the circular electrode C produces a pumping action on the resonator 12 which enhances the natural motion of the resonator as it vibrates thereby replenishing the energy lost during vibration. A reference signal at a frequency of $w_0$ is obtained from a phase locked loop generally designated 138 which includes a phase detector 144, filter 146, voltage controlled oscillator (VCO) 148 and a divider 150. Logic circuitry 152 responds to outputs of the divider 150 to develop a $2w_0$ square wave signal, sample pulses occurring at the 0° and 180° crossover points of the reference signal and 0, $\pi/4$, $\pi/2$ and $\pi$ phase signals which are useful for demodulation purposes.

As previously indicated the frequency of the reference signal is a weighted average of the frequencies of the signals $A_s$ and $A_s'$. Greater weight is given to the frequency of the signal having the greater amplitude. This is accomplished by detecting the quadrature content of the signals $A_s$ and $A_s'$ relative to the reference signal and adjusting $w_0$ so that the sum of the quadrature components of the signals $A_s$ and $A_s'$ is driven to zero. Accordingly, the signals $A_s$, $-A_s$, $A_s'$, $-A_s'$ are applied to quadrature detectors 160–166, respectively, which are sample and hold circuits which develop a dc voltage indicative of the amount of quadrature content existing in the input signals at the 0° and 180° crossover points of the reference signal. The output of the detectors 160 and 162 are summed at 168 and amplified and filtered at 170 to produce a dc signal designated SIN QUAD which represents the average quadrature or out of phase component of the $A_s$ signal relative to the reference signal. Similarly, the outputs of the detectors 164 and 166 are summed at 172 and amplified and filtered at 174 to produce a dc signal designated COS QUAD which represents the average quadrature or out of phase component of the $A_s'$ signal relative to the reference signal. The signals $A_s$ and $A_s'$ are fed to a quadrant detector generally designated 176 comprising demodulators 178 and 180, filters 182 and 184, comparators 186 and 188 and logic circuitry 190. The quadrant decoder 176 controls polarity switches 192 and 196 so that the detected SIN QUAD signal is inverted when the pattern is in the 3rd and 4th quadrant and controls polarity switches 194 and 198 so that the COS QUAD signal is inverted when the pattern is in the 2nd and 3rd quadrants. The SIN QUAD and COS QUAD signals are applied to adder 200 to produce a QUAD $\Sigma$ signal. The QUAD $\Sigma$ signal is fed to amplifier and loop compensation circuitry 202 which provides integral plus proportional control to ensure stability of the frequency control loop. The output of the circuitry 202 is connected to the VCO 148 through a switch 204 which is turned on after the start up operation is completed as explained hereinafter. Since the level of the SIN QUAD and COS QUAD signals is a function of the amplitude of the signals $A_s$ and $A_s'$ the adjustment of the VCO 148 is weighted in favor of the frequency of the larger of the two signals $A_s$ and $A_s'$.

Phase error correction is accomplished by applying appropriate dc voltages to the four electrodes along the A, A', B and B' axis sets. It can be shown that the force produced by a dc voltage on a set of four orthogonal pads acts like a negative spring thereby tending to lower the frequency of motion on the axis where the voltage is applied. To control the phase of A' with respect to A when the pattern is along A, a dc voltage must be applied along B or B' depending upon whether A' lags or leads A. For instance, if the pattern is primarily along A with A' leading A, then a dc voltage should be applied along B to reduce the frequency of the B component of the resonator motion thereby reducing the observed phase shift of A'. The voltages to be applied depends on the phase error and the pattern location.

The phase control circuitry includes an adder 210 which produces at its output a signal QUAD $\Delta$ which equals the difference between the quadrature content of the $A_s$ and $A_s'$ signals, i.e., the difference between SIN QUAD and COS QUAD. The sign of QUAD $\Delta$ is arbitrarily made to be positive if COS QUAD is greater than SIN QUAD, and negative if SIN QUAD is greater than COS QUAD by control of the polarity switches 194 and 198. In the first quadrant the SIN QUAD value is inverted and added to the noninverted COS QUAD value. In the second quadrant the SIN QUAD and COS QUAD values are added without any polarity reversal. In the third quadrant the COS QUAD value is inverted and added to the noninverted SIN QUAD value. In the fourth quadrant SIN QUAD and COS QUAD are both inverted and added. Thus, the output of the adder 210 is always the difference between the quadrature components of $A_s$ and $A_s'$ and is positive if COS QUAD is the larger value or negative if SIN QUAD is the larger value. This QUAD $\Delta$ signal is fed to amplifying and loop compensation circuitry 212 for loop stability and then to one input of multipliers 216 and 218. The other input to multipliers 216 and 218, namely, SIN $4\theta$/SIN $4\theta_{\frac{1}{2}}$ and COS $4\theta$/COS $4\theta_{\frac{1}{2}}$ compensation for the fact that the force applied to the resonator is proportional to the square of the voltage applied to the forcer electrodes and also takes into account the pattern-location dependency of the relative voltages to be applied to the discrete forcer electrodes in order to eliminate any phase difference. The inputs SIN $4\theta$/SIN $4\theta_{\frac{1}{2}}$ and COS $4\theta$/COS $4\theta_{\frac{1}{2}}$ are conveniently provided by the angle read out computer 128. The outputs of multiplier 216 controls the proportion of the 400 volt dc applied to the A axis electrodes F1, F5, F9, F13 and A' axis electrodes F3, F7, F11 and F15 from the supply 136 through drivers 220, 222 and 224 respectively. The output of the multiplier 218 controls the proportion of the 400 volt dc supplied to the B axis electrodes F2, F6, F10, F14 and B' axis electrodes F4, F8, F12 and F16 through drivers 226 and 228, respectively. The output of multipler 218 is applied to the B axis forcer electrodes F2, F6, F10 and F14 or to the B' axis electrodes F4, F8, F12 and F16 depending on the sign of the output. The output of multiplier 218 is applied through inverter 230 to driver 228 so that driver 228 is enabled when the output of multiplier 218 is negative. Driver 226 is enabled when the output of multiplier 218 is positive. Similarly, an inverter 232 is connected between the multiplier 216 and driver 224 to indicate that the A' electrodes F3, F7, F11 and F15 are driven when the output of multiplier 216 is negative while the A electrodes F1, F5, F9 and F13 are driven when the output of multiplier 216 is positive.

To initiate oscillation of the resonator 12 the supply 136 is periodically applied to the forcer electrode F1, F9 through driver 220. A comparator 240 compares the resonator amplitude as detected at 129 with a reference voltage. As long as the resonator amplitude is below the reference the comparator causes switches 242 and 244 to be closed and through inverter 246 maintains the switch 204 open. This causes the signal $A_s$ to be applied to the phase locked loop 138 and to amplifiers and phase shift circuitry 248. The circuitry 248 shifts the input signal so that the output to the driver 220 leads the signal $A_s$ by 45°. The driver 220 only responds to positive signals so that the voltage supply 136 is only applied to the pads F1 and F9 during the positive half cycle of $A_s$ thus producing a pumping action which aids the natural motion of the resonator 12 along the F1, F9 axis thus bringing the amplitude of peak vibration up to 4.3 volts dc. Thereafter, the VCD 148 is controlled from the QUAD $\Sigma$ signal and resonator amplitude is maintained by the output of the driver 134.

The embodiments of the invention in which an exclusive property or privilege is claimed are defined as follows:

1. A vibratory rotation sensor comprising a resonator capable of sustaining a vibration pattern in a plane perpendicular to an input axis, means supporting said resonator along said input axis, means responsive to the phase of components of resonator motion along first and second axes perpendicular to said input axis and separated by a predetermined angle for applying forces to said resonator to eliminate any phase difference between the components of resonator motion along said first and second axes to thereby maintain resonator motion at a single frequency and phase regardless of pattern location.

2. A vibratory rotation sensor comprising a resonator capable of sustaining a vibration pattern in a plane perpendicular to an input axis, means supporting said resonator along said input axis, means responsive to the phase of components of resonator motion along first and second axes perpendicular to said input axis and separated by a predetermined angle for applying a force to said resonator along one or more of four axes including said first and second axes and separated by one-half of said predetermined angle to thereby eliminate any phase difference between the components of resonator motion along said first and second axes and maintain resonator motion at a single frequency and phase regardless of pattern location.

3. A vibratory rotation sensor comprising a resonator capable of sustaining an elliptical vibration pattern in a plane perpendicular to an input axis, means supporting said resonator along said input axis, means responsive to the phase of components of resonator motion along first and second axes perpendicular to said input axis and separated by 45° for applying a force to said resonator along one or more of four axes including said first and second axes and separated by 22.5° to thereby eliminate any phase difference between the components of resonator motion along said first and second axes and maintain resonator motion at a single frequency and phase regardless of pattern location.

4. A vibratory rotation sensor comprising a resonator capable of sustaining an elliptical vibration pattern in a plane perpendicular to an input axis, means supporting said resonator along said input axis, means responsive to the phase of components of resonator motion along first and second axes perpendicular to said input axis and separated by 45° for applying a force to said resonator along one or more of four axes including said first and second axes and separated by 22.5° to thereby eliminate any phase difference between the components of resonator motion along said first and second axes and maintain resonator motion at a single frequency and phase regardless of pattern location, means for maintaining a predetermined amplitude of resonator motion, and means for detecting said pattern location.

5. A vibratory rotation sensor comprising a hemispherically shaped resonator, means supporting said resonator along an axis extending through the pole of said resonator, control means for establishing and maintaining an elliptical vibration pattern of a predetermined amplitude and of a frequency corresponding to a weighted average of the two resonant frequencies of said resonator, said control means including means responsive to pattern vibration along two axis sets separated by 45° for applying a negative spring force at discrete locations about the periphery of said resonator for maintaining the pattern vibration along said axis sets in phase.

6. A vibratory rotation sensor comprising a hemispherically shaped resonator, means supporting said resonator along an axis extending through the pole of said resonator, means for initiating an elliptical vibration pattern in said resonator, means producing electrical signals representing said vibration pattern along first and second axis sets separated by 45°, means responsive to said signals for applying a parametric force to said resonator for maintaining a predetermined peak amplitude of said vibration pattern, means responsive to said signals for applying a negative spring force to said resonator along appropriate ones of four axis sets separated by $22\frac{1}{2}°$ to maintain the components of pattern vibration along said pickoff axis sets in phase.

7. A vibratory rotation sensor comprising a hemispherically shaped resonator capable of exhibiting an elliptical vibration pattern, means supporting said resonator along an axis extending through the pole of said resonator, pickoff means for producing electrical signals representing pattern motion along first and second axis sets separated by 45°, a circular electrode supported by said support means and located adjacent one surface of said resonator, first, second, third and fourth sets of four orthogonal electrodes supported by said support means adjacent one surface of said resonator along four axis sets separated by 22.5°, control means responsive to said electrical signals for applying a control voltage to said circular electrode of an amplitude and frequency sufficient to maintain a predetermined peak amplitude of pattern vibration regardless of pattern location and for applying an appropriate voltage to certain ones of said sets of discrete electrodes to maintain components of pattern vibration along said first and second axis sets in phase.

8. A vibratory rotation sensor comprising a hemispherically shaped resonator, forcer means including a circular forcer electrode and first, second, third and fourth sets of discrete orthogonal forcer electrodes, forcer housing means supporting said circular forcer electrodes and said discrete forcer electrodes adjacent to but spaced from one side of said resonator, said first and second sets of discrete forcer electrodes displaced one from the other by 45° and defining first and second axis sets, said third and fourth sets of forcer electrodes displaced one from the other by 45° and defining third and fourth axis sets interposed between said first and second sets, pickoff means responsive to resonator motion along said first and second axis sets and including first and second sets of discrete orthogonal pickoff electrodes, pickoff housing means supporting said pickoff electrodes adjacent to but spaced from the other side of said resonator, control means interconnected with said pickoff means and said forcer means and responsive to inputs from said pickoff means for applying a control voltage of amplitude and frequency sufficient to maintain an elliptical vibration pattern in said resonator at an average of the two resonant frequencies of said resonator and of a predetermined amplitude regardless of the location of said vibration pattern, said control means applying a dc voltage to certain ones of the orthogonal sets of discrete electrodes for eliminating any phase difference between the components of the vibration pattern along said first and second axis sets, and means responsive to said inputs from said pickoff means for determing the location of said vibration pattern.

9. A vibratory rotation sensor comprising a hemispherically shaped resonator, an integral stem extending from the pole of said resonator, an inner housing having a passage for receiving said stem and for supporting said resonator, a plurality of forcer electrodes supported by said inner housing and located adjacent to but spaced from one side of said resonator, said forcer electrodes including a circular forcer electrode and four sets of discrete forcer electrodes each set of which comprises four orthogonal electrodes, an outer housing, first and second sets of discrete pickoff electrodes each set comprising four orthogonal electrodes supported by said outer housing and located adjacent to but spaced from the other side of said resonator, a circuit board supported by said inner housing and electrically interconnecting certain ones of said discrete forcer electrodes, means joining the inner and outer housings and hermetically sealing the resonator environment.

10. A vibratory rotation sensor comprising a hemispherically shaped resonator formed of fused quartz and having its inner and outer surfaces plated with a conductive material to form separate electrodes, an integral stem extending from the pole of said resonator, an inner housing formed of fused quartz having a spherical outer surface and a passage for receiving said stem and for supporting said resonator, a plurality of forcer electrodes plated on said inner housing and located adjacent to but spaced from one electrode on said resonator, said forcer electrodes including a circular forcer electrode and four sets of discrete forcer electrodes each set of which comprises four orthogonal electrodes, an outer housing formed of fused quartz having a spherical inner surface, first and second sets of discrete pickoff electrodes plated on said inner surface, each set of pickoff electrodes comprising four orthogonal electrodes located adjacent to but spaced from the electrode on the other side of said resonator, a plurality of passages formed in said inner and outer housings providing electrical connection to said electrodes on said resonator, said pickoff electrodes and certain ones of said forcer electrodes, a circuit board formed of fused quartz supported by said inner housing and electrically interconnecting certain other of said discrete forcer electrodes with said certain ones of said forcer electrodes, means bonding the inner and outer housings together and means hermetically sealing the internal environment of the sensor.

* * * * *

UNITED STATES PATENT AND TRADEMARK OFFICE
CERTIFICATE OF CORRECTION

PATENT NO. : 4,157,041

DATED : June 5, 1979

INVENTOR(S) : Edward J. Loper, Jr.
David D. Lynch

It is certified that error appears in the above-identified patent and that said Letters Patent are hereby corrected as shown below:

Column 6, line 26, "$A_s 40$" should read -- $A_s'$ --;

Column 6, lines 45-46, "SIN 4θ/SIN 4θ½" should read -- $\frac{SIN\ 4\theta}{|SIN\ 4\theta|_{\frac{1}{2}}}$ --;

Column 6, line 46, "COS 4θ/COS 4θ½" should read -- $\frac{COS\ 4\theta}{|COS\ 4\theta|_{\frac{1}{2}}}$ --;

Column 6, line 52, "SIN 4θ/SIN 4θ½" should read -- $\frac{SIN\ 4\theta}{|SIN\ 4\theta|_{\frac{1}{2}}}$ --;

Column 6, lines 52-53, "COS 4θ/COS 4θ½" should read -- $\frac{COS\ 4\theta}{|COS\ 4\theta|_{\frac{1}{2}}}$ --.

Signed and Sealed this

*Ninth* Day of *October 1979*

[SEAL]

*Attest:*

RUTH C. MASON
*Attesting Officer*

LUTRELLE F. PARKER
*Acting Commissioner of Patents and Trademarks*